United States Patent
Liu (10) Patent No.: US 9,900,543 B1
(45) Date of Patent: Feb. 20, 2018

(54) SYNCHRONIZATION CONTROL DEVICE AND METHOD FOR USE IN TV SYSTEM

(71) Applicant: Wistron Corp., New Taipei (TW)

(72) Inventor: Wei-Lun Liu, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 15/707,981

(22) Filed: Sep. 18, 2017

(30) Foreign Application Priority Data

Apr. 20, 2017 (TW) .............................. 106113251 A (51) Int. Cl.
- *H04N 5/63* (2006.01)
- *H04N 5/44* (2011.01)
- *H04N 21/41* (2011.01)
- *H04N 5/04* (2006.01)

(52) U.S. Cl.
CPC ............. *H04N 5/4403* (2013.01); *H04N 5/04* (2013.01); *H04N 21/4104* (2013.01); *H04N 2005/4426* (2013.01)

(58) Field of Classification Search
CPC .................................................. H04N 5/23222
USPC .................................................. 348/180, 730
See application file for complete search history.

(56) References Cited

U.S. PATENT DOCUMENTS

| 9,232,265 B2 * | 1/2016 | Maxwell ................. H04L 12/12 |
| 2015/0155739 A1 * | 6/2015 | Walley ................ H01M 2/0267 320/108 |

* cited by examiner

*Primary Examiner* — Paulos M Natnael (57) ABSTRACT

A synchronization control device for use in a TV system is provided. The TV system includes a TV and a first electronic device. The synchronization control device includes: a microcontroller; a first detection apparatus, and a second detection apparatus. The synchronization control device is capable of detecting the power state of the TV and of the first electronic device using color image sensors to detect the status of power indicators of the TV and of the first electronic device. When the power state of the TV is different from that of the first electronic device, the microcontroller controls a first infrared emitter in the first detection apparatus to emit a infrared control signal to the TV to switch the power state of the TV, so that the power state of the TV is synchronized to the power state of the first electronic device.

10 Claims, 5 Drawing Sheets

SYNCHRONIZATION CONTROL DEVICE AND METHOD FOR USE IN TV SYSTEM

CROSS REFERENCE TO RELATED APPLICATIONS

This Application claims priority of Taiwan Patent Application No. 106113251, filed on Apr. 20, 2017, the entirety of which is incorporated by reference herein.

BACKGROUND OF THE INVENTION

Field of the Invention

The present invention relates to TV systems, and, in particular, to a synchronization control device and method for use in a TV system.

Description of the Related Art

With the advancement of technology, set-top boxes have seen wide use by many families. Set-top boxes are capable of receiving video signals from different sources and displaying the received video signals on TVs. When a user wants to view a TV program, he or she has to separately turn off the power to the set-top box and the TV. However, the set-top box and the TV are usually equipped with different remote controls, and may be installed on different positions. Thus, the user is not capable of perceiving the power states of set-top box and the TV at the same time. For example, in a first scenario, the set-top box is turned on, but the TV is not turned on, resulting in a black screen on the TV. In a second scenario, the TV is turned on, but the set-top box is not turned on, resulting in no signal to the TV. The aforementioned scenarios may be inconvenient for the user, resulting in poor user experience. In addition, very often when a user turns off the TV system, he leaves either the TV or the set-top box turned on, resulting in unnecessary power consumption.

Accordingly, there is demand for a synchronization control device and method thereof for use in a TV system to solve the aforementioned problems.

BRIEF SUMMARY OF THE INVENTION

A detailed description is given in the following embodiments with reference to the accompanying drawings.

In an exemplary embodiment, a synchronization control device for use in a TV system is provided. The TV system includes a TV and a first electronic device. The synchronization control device includes: a microcontroller; a first detection apparatus, and a second detection apparatus. The first detection apparatus includes: a first color image sensor, for detecting a first status of a first power indicator of the TV; and a first infrared emitter, for emitting a first infrared control signal to the TV to switch a first power state of the TV. The second detection apparatus includes: a second color image sensor to detect a second status of a second power indicator of the first electronic device. The microcontroller determines a second power state of the first electronic device according to the second status of the second power indicator of the first electronic device, and determines the first power state of the TV according to the first status of the first power indicator of the TV. When the first power state of the TV is different from the second power state of the first electronic device, the microcontroller controls the first infrared emitter to emit the first infrared control signal to the TV to switch the first power state of the TV, so that the first power state of the TV is synchronized to the second power state of the first electronic device.

In another exemplary embodiment, a synchronization control method for use in a TV system is provided. The TV system includes a TV, a first electronic device, and a synchronization control device. The method includes the steps of: utilizing a first color image sensor of the synchronization control device to detect a first status of a first power indicator of the TV; utilizing a first infrared emitter of the synchronization control device to emit a first infrared control signal to the TV to switch the first power state of the TV; utilizing a second color image sensor of the synchronization control device to detect the second status of a second power indicator of the first electronic device; determining the second power state of the first electronic device according to the second status of the second power indicator of the first electronic device, and determining the first power state of the TV according to the first status of the first power indicator of the TV; and controlling the first infrared emitter to emit the first infrared control signal to the TV to switch the first power state of the TV when the first power state of the TV is different from the second power state of the first electronic device, so that the first power state of the TV is synchronized to the second power state of the first electronic device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
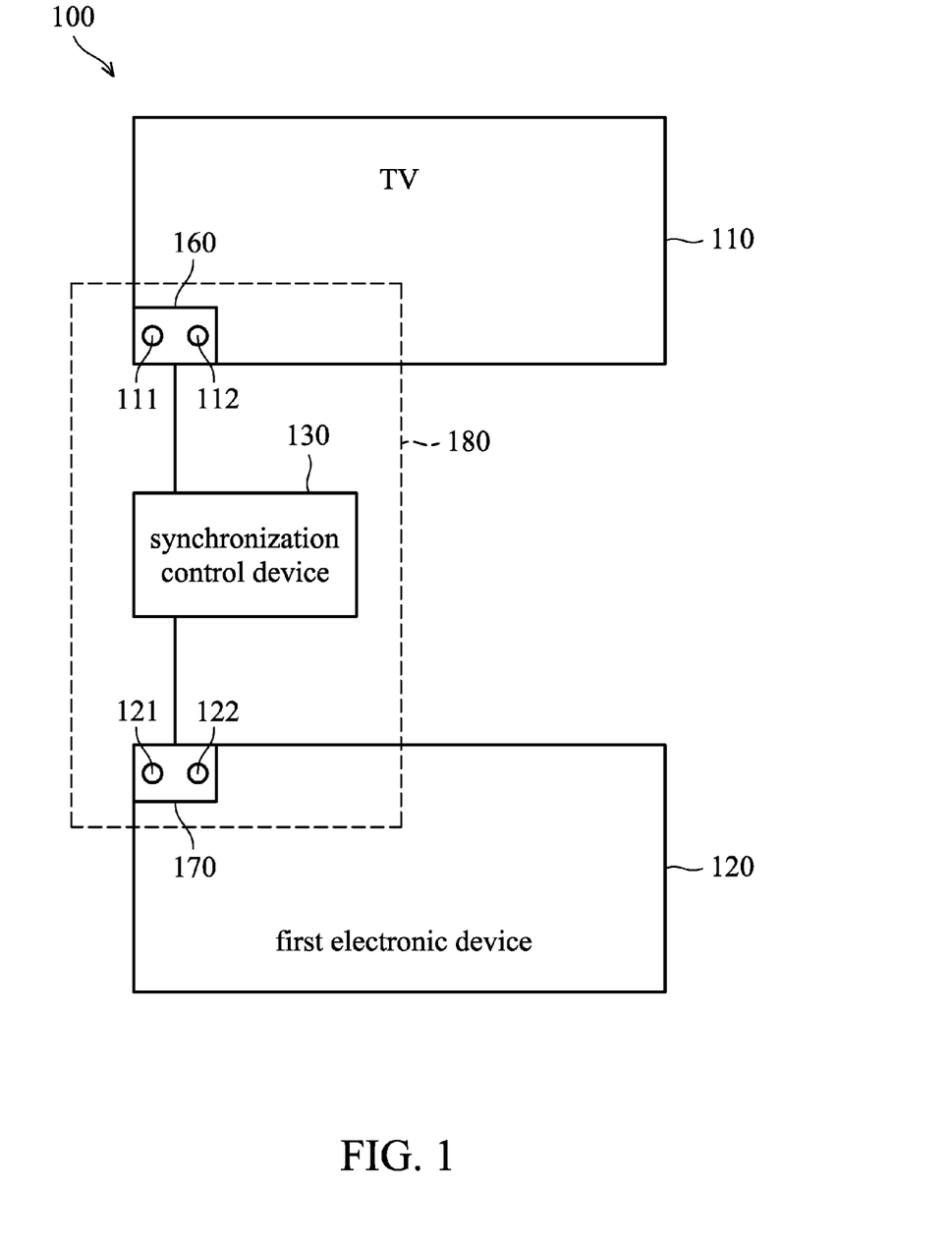
FIG. 1 is a schematic block diagram of a TV system in accordance with an embodiment of the invention.

FIG. 1 is a schematic block diagram of a TV system in accordance with an embodiment of the invention. As illustrated in FIG. 1, the TV system 100 includes a TV 110, a first electronic device 120, and a synchronization control device 130. The first electronic device 120 may be a set-top box that is capable of receiving analog or digital video signals from cables or terrestrial TVs, and performing corresponding demodulation or video processing on the received analog or video signals to generate an output video signal that is transmitted to the TV 110 for display via a connection. The first TV electronic device may also be a video recorder or a multimedia player. For example, the aforementioned connection may be a multimedia transmission cable (e.g. supporting the HDMI or DisplayPort standards, but not limited), or a wireless communication connection (e.g. via Wifi or other wireless communication protocols).

The synchronization control device 130 is configured to synchronize the power states of the first electronic device 120 and the TV 110. For example, when a user wants to view a TV program on the TV 110, the user has to separately turn on the power to the first electronic device 120 and to the TV 110. However, the first electronic device 120 and the TV 110 are usually equipped with different remote controls, and may be disposed on different positions. Thus, the user is not capable of perceiving the power states of the first electronic device 120 and the TV 110 at the same time. For example, in a first scenario, the first electronic device 120 is turned on, but the TV 110 is not turned on, resulting in a black screen on the TV 110. In a second scenario, the TV 110 is turned on, but the first electronic device 120 is not turned on, resulting in no signal to the TV 110. The aforementioned scenarios may cause the user inconvenience, resulting in a poor user experience. In addition, if the user wants to turn off the TV system 100, the TV 110 or the first electronic device 120 may remain on, resulting in unnecessary power consumption.

The synchronization control device 130 is capable of synchronizing the power states of the first electronic device 120 and the TV 110 to a power-on state or a power-off state. Specifically, the synchronization control device 130 includes an infrared detector 141 and an infrared detector 151 for respectively detecting statuses of the power indicators on the TV 110 and the first electronic device 120. For example, the infrared detectors 141 and 151 respectively detect whether the power indicators on the TV 110 and the first electronic device 120 are activated, and the details will be described later.

For example, the region 160 on the TV 110 includes a power indicator 111 and an infrared receiver 112. The region 170 on the first electronic device 120 includes a power indicator 121 and an infrared receiver 122. The synchronization device 130 may detect the statuses of the power indicators 111 and 121 in the region 160 of the TV 110 and the region 170 of the first electronic device 120 via a detection apparatus 140 and a detection apparatus 150 (i.e. referring to FIG. 2), respectively. For example, the detection apparatus 140 is attached on the surface of the region 160 of the TV 110, and the detection apparatus 150 may be disposed, attached, or fixed on the surface of the region 170 of the first electronic device 120. The detection apparatuses 140 and 150 are configured to detect statuses of the power indicators 111 and 121 in the region 160 of the TV 110 and the region 170 of the first electronic device 120, respectively.

Figure 2:
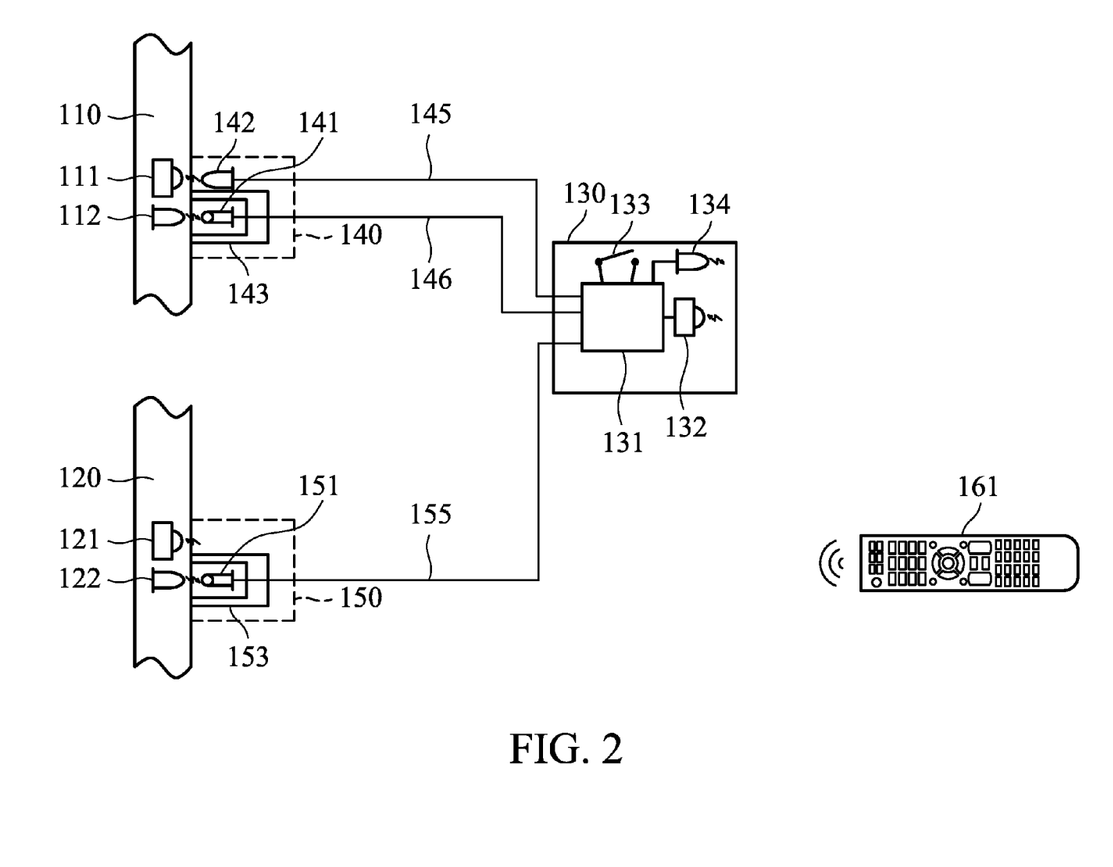
FIG. 2 is a schematic block diagram of region 180 of the TV system in accordance with an embodiment of the invention.

FIG. 2 is a schematic block diagram of region 180 of the TV system in accordance with an embodiment of the invention.

Referring to FIG. 1 and FIG. 2, the region 180 in FIG. 1 illustrates the connection between the synchronization control device 130 and the region 160 of the TV 110 and the region 170 of the first electronic device 120. The schematic block diagram of the components in the region 180 is shown in FIG. 2.

For example, the synchronization control device 130 includes a microcontroller 131, an infrared receiver 132, a mode switching button, a power indicator 134, a detection apparatus 140, and a detection apparatus 150. The microcontroller 131 is configured to detect the power statuses of the TV 110 and the first electronic device 120, and can be switched between a device synchronization mode and a learning mode via the mode switching button 133. The infrared receiver 132 is configured to receive an infrared control signal from a remote control 161 (e.g. capable of controlling the first electronic device 120 or the TV 110). For example, when the microcontroller 131 is in the learning mode, the microcontroller 131 may copy the infrared control signals of different function buttons of the first electronic device 120 or the TV 110 from the remote control 161. The power indicator 134 is configured to display the power status of the synchronization control device 130.

The detection apparatus 140 includes a color image sensor 141, an infrared emitter 142, and a light insulation component 143. The color image sensor 141 is connected to the microcontroller 131 via a connection cable 146, and is configured to detect light emitted from the power indicator 112 of the TV 110. The light insulation component 143 is configured to fully cover the color image sensor 141, so that the color image sensor 141 will not be affected by the ambient light and is capable of precisely detecting the light emitted from the power indicator 112 of the TV 110, such as detecting whether the power indicator 112 is turned on and its color. The infrared emitter 142 is connected to the microcontroller 131 via a connection cable 145, and is configured to emit an infrared control signal to control the power state of the TV 110.

The detection apparatus 150 includes a color image sensor 151 and a light insulation component 153. The color image sensor 151 is connected to the microcontroller 131 via a connection cable 155, and is configured to detect light emitted from the power indicator 122 of the first electronic device 120. The light insulation component 153 is configured to fully cover the color image sensor 151, so that the color image sensor 151 will not be affected by the ambient light and is capable of precisely detecting the light emitted from the power indicator 122 of the first electronic device 120, such as detecting whether the power indicator 122 is turned on and its color. In an embodiment, the remote control 161 is configured to control various functions of the first electronic device 120, and the user may use the remote control 161 to turn on or turn off power to the first electronic device 120.

In an embodiment, the user may use the remote control 161 to emit a first infrared control signal to the infrared receiver 121 of the first electronic device 120, thereby turning on power to the first electronic device 120. Meanwhile, the power indicator 122 will be lit up, and the color image sensor 151 of the detection apparatus 150 may detect the status of the power indicator 122 and generate a detection signal that is transmitted to the microcontroller 131. Then, the microcontroller 131 may detect that the power to the first electronic device 120 is turned on. Subsequently, the microcontroller 131 further determines the power state of the TV 110. For example, the microcontroller 131 may determine whether the power indicator 112 of the TV 110 is lit up according to a detection signal from the color image sensor 141. If the microcontroller 131 determines that that the power to the TV 110 is not turned on, the microcontroller 131 may control the infrared emitter 141 of the detection apparatus 140 to emit a second infrared control signal to the infrared receiver 111 of the TV 110 to turn on the power to the TV 110. The power to the TV 110 is turned on after the infrared receiver 111 of the TV 110 has received the second infrared control signal, and then the power indicator 112 will be lit up. Thus, the microcontroller 131 may determine that the power to the TV 110 is turned on according to the detection signal from the color image sensor 141. Accordingly, both the first electronic device 120 and the TV 110 are synchronized to the power-on state.

In addition, the user may also use the remote control 161 to emit a third infrared control signal to the infrared receiver 121 of the first electronic device 120 to turn off the power to the first electronic device 120. Meanwhile, the power indicator 122 of the first electronic device 120 will be lit off, and the color image sensor 151 of the detection apparatus 150 may generate a detection signal that is transmitted to the microcontroller 131. Thus, the microcontroller 131 may determine that the power to the first electronic device 120 has been turned off. Subsequently, the microcontroller 131 further determines the power state of the TV 110. For example, the microcontroller 131 may determine whether the power indicator 112 of the TV 110 is lit up according to the detection signal from the color image sensor 141. If the microcontroller 131 determines that the power to the TV 110 is turned on, the microcontroller 131 may control the infrared emitter 141 of the detection apparatus 140 to emit a fourth infrared control signal to the infrared receiver 111 of the TV 110 to turn of the power to the TV 110. After the infrared receiver 111 of the TV 110 has received the fourth infrared control signal, the power to the TV 110 will be turned off, and the power indicator 112 will also be lit off. Thus, the microcontroller 131 may determine that the power to the TV 110 is turned off according to the detection signal from the color image sensor 141. Accordingly, both the first electronic device 120 and the TV 110 are synchronized to a power-off state.

Specifically, by using the synchronization control device 130 in the invention, the user may use the remote control 161 of the first electronic device 120 to synchronize the power states of the first electronic device 120 and the TV 110. For example, both the first electronic device 120 and the TV 110 can be synchronized to a power-on state or a power-off state.

Figure 3:
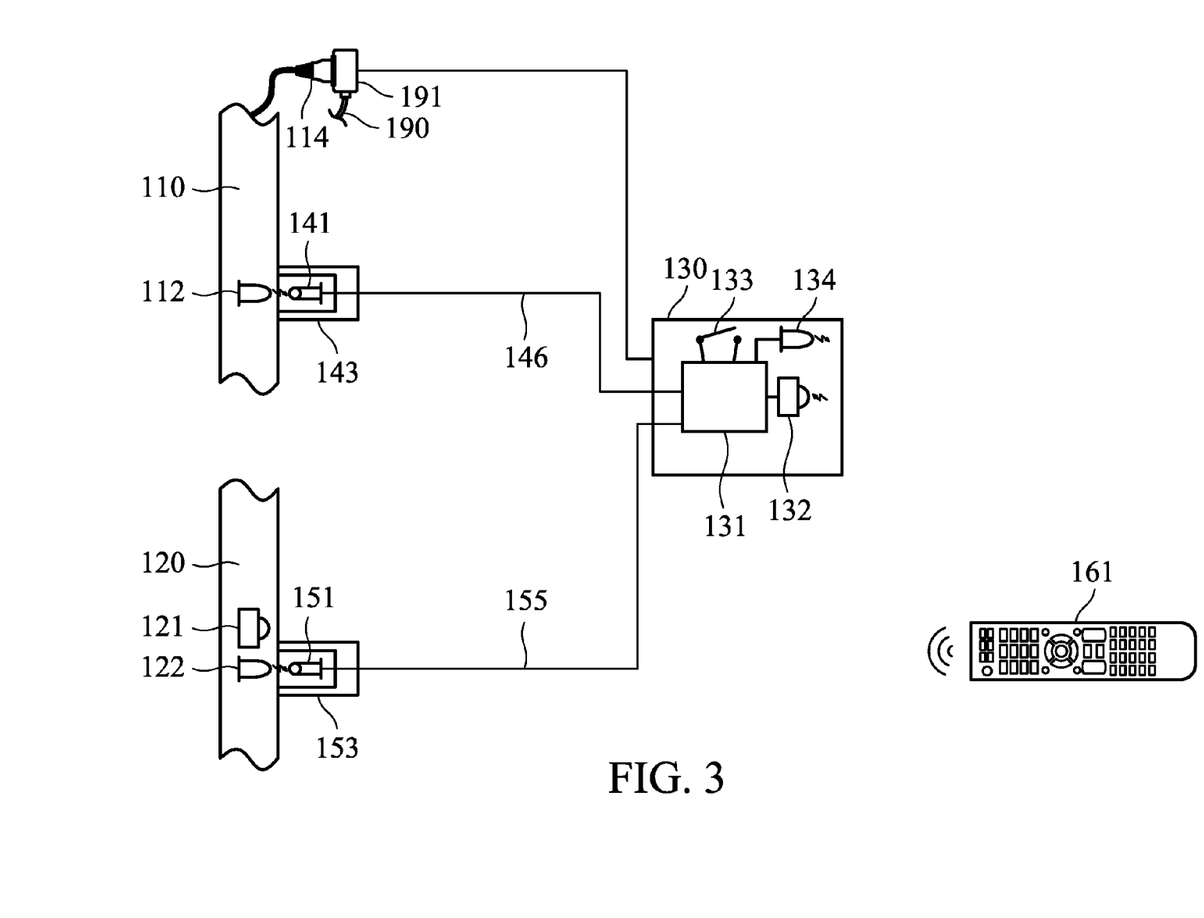
FIG. 3 is a schematic block diagram in the region 180 of the TV system in accordance with another embodiment of the invention.

FIG. 3 is a schematic block diagram in the region 180 of the TV system in accordance with another embodiment of the invention. The components in FIG. 3 are similar to those in FIG. 2, and the differences between FIG. 3 and FIG. 2 is that the detection apparatus in FIG. 3 only includes the color image sensor 141 and the light insulation component 143, and the TV system 100 further includes a power control apparatus 191. The power control apparatus 191 is connected to a power source 190 (e.g. supply mains), and the power control apparatus 191 provide power to the TV 110 and the synchronization control device 130. For example, the power cable 114 of the TV 110 is connected to the power control apparatus 191, and the synchronization control device 130 may control the power control apparatus 191, and determine whether to provide power to the TV 110 via the power control apparatus 191.

The operations in FIG. 3 are similar to those in FIG. 2. The infrared emitter 142 is omitted in the detection apparatus 140 in FIG. 3, and the synchronization control device 130 may control the power control apparatus 191 to determine whether to provide power to the TV 110. That is, when the user turns on or off power to the first electronic device 120 via the remote control 161, the microcontroller 131 may detect the status of the power indicator 112 of the TV 110 and synchronize the power state of the TV 110 to that of the first electronic device 120 via the power control apparatus 191.

For example, when the user users the remote control 161 to emit a first infrared control signal to the infrared receiver 121 of the first electronic device 120 to turn on power to the first electronic device 120. Meanwhile, the power indicator 122 of the first electronic device 120 will be lit up, and the color image sensor 151 of the detection apparatus 150 may detect the status of the power indicator 122 to generate a detection signal that is transmitted to the microcontroller 131, so that the microcontroller 131 may detect that the power to the first electronic device 120 has been turned on. Then, the microcontroller 131 further determines the power state of the TV 110. For example, the microcontroller 131 may determine whether the power indicator 112 of the TV 110 is lit up according to the detection signal from the color image sensor 141. If the microcontroller 131 determines that the power to the TV 110 is not turned on, the microcontroller 131 may control the power control apparatus 191 to provide power to the TV 110, and thus the TV 110 enters the power-on state.

The user may also use the remote control 161 to emit a third infrared control signal to the infrared receiver 121 of the first electronic device 120 to turn off power to the first electronic device 120. Meanwhile, the power indicator 122 of the first electronic device 120 will be lighted off, and the color image sensor 151 of the detection apparatus 150 may detect the status of the power indicator 122 to generate a detection signal that is transmitted to the microcontroller 131, and the microcontroller 131 may detect that the power to the first electronic device 120 has been turned off. Then, the microcontroller 131 further determines the power state of the TV 110. For example, the microcontroller 131 may determine whether the power indicator 112 of the TV 110 is lit up according to the detection signal from the color image signal 141. If the microcontroller 131 determines that the power to the TV 110 is turned on, the microcontroller may control the power control apparatus 191 to turn off power to the TV 110, so that the TV 110 enters the power-off state, and the power indicator 112 will be lighted off. The microcontroller 131 may determine that the power to the TV 110 has been turned off according to the detection signal from the color image sensor 141. That is, both the first electronic device 120 and the TV 110 are in a power-off condition.

Figure 4:
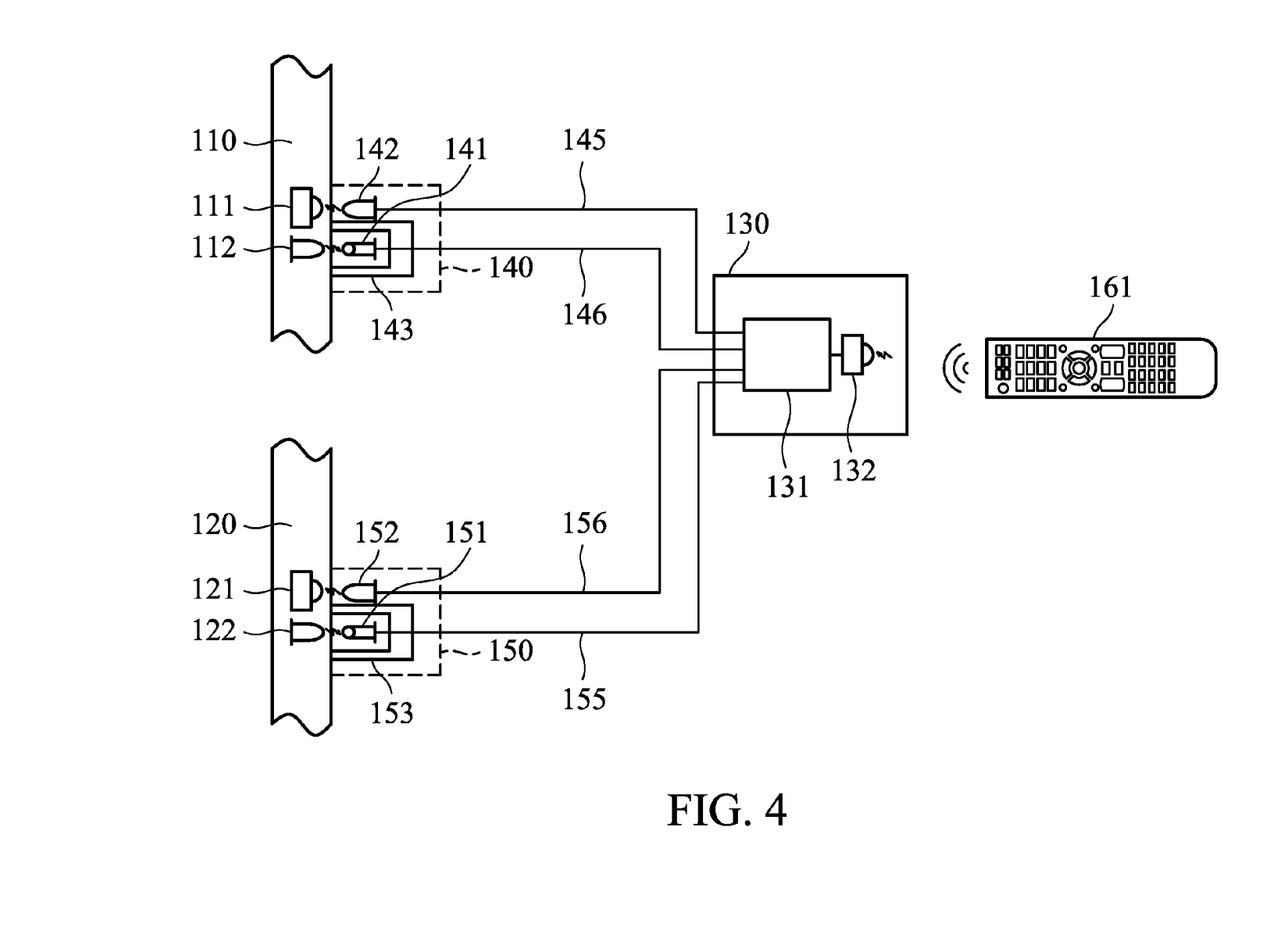
FIG. 4 is a schematic block diagram in the region 180 of the TV system in accordance with yet another embodiment of the invention.

FIG. 4 is a schematic block diagram in the region 180 of the TV system in accordance with yet another embodiment of the invention. The components in FIG. 4 are similar to those in FIG. 2, and the differences between FIG. 4 and FIG. 2 are that the detection apparatus 140 in FIG. 4 further includes an infrared emitter 142 that is connected to the microcontroller via a connection cable 156. In addition, the remote control 161 is configured to control the synchronization control device 130, thereby controlling the power states of the TV 110 and the first electronic device 120. For example, referring to FIG. 1, the synchronization control device 130 may enter the learning mode, and the user may use the remote control 161 to emit an infrared control signal of various functions of the first electronic device 120 to the synchronization control device 130. The synchronization control device 10 may record and learn the infrared control signal of various functions of the first electronic device 120 from the remote control 161. After the synchronization control device 130 has finished learning, the user may use the remote 161 to emit a corresponding infrared control signal to the synchronization control device 130, and the microcontroller 131 of the synchronization control device 130 may control the infrared emitter 152 of the detection apparatus 150 to emit the same infrared control signal from the remote control 161 to the infrared receiver 121 of the first electronic device 120.

Specifically, the synchronization control device 130 may relay the infrared control signal from the remote control 161 to the first electronic device 120, thereby controlling the power state of the first electronic device 120. The remaining operations for controlling the power states in FIG. 5 are similar to those in FIG. 1, and thus the details will be omitted here.

Figure 5:
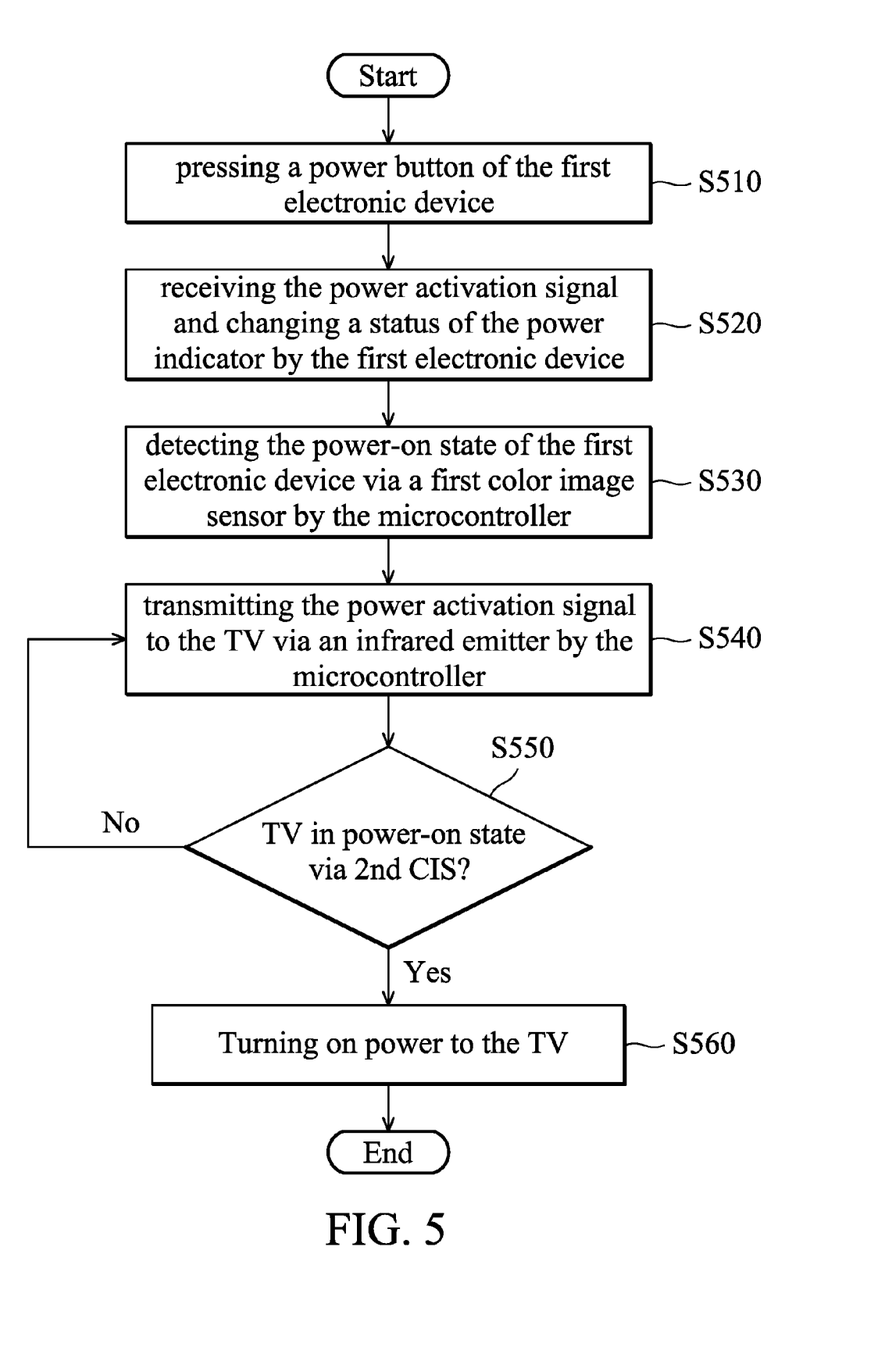
FIG. 5 is a flow chart of a synchronization control method in accordance with an embodiment of the invention.

FIG. 5 is a flow chart of a synchronization control method in accordance with an embodiment of the invention. In step S510, a power button of the first electronic device 120 is pressed. In step S510, the user may use the remote control 161 to turn on or off power to the first electronic device 120, or switch the power state of the first electronic device 120 via the same power activation signal. Alternatively, the user may also press the physical power button on the first electronic device 120 to turn on or off power to the first electronic device 120.

In step S520, the first electronic device 120 receives the power activation signal and changes a status of the power indicator.

In step S530, the microcontroller detects the power-on state of the first electronic device 120 via a first color image sensor (e.g. color image sensor 151).

In step S540, the microcontroller 131 sends the power activation signal to the TV 110 via an infrared emitter 142.

In step S550, the microcontroller 131 detects whether the TV 110 is in the power-on state via a second color image sensor (e.g. color image sensor 141).

In step S560, power to the TV 110 is turned on.

It should be noted that the power activation signal can also be used to control the power-state switching of the first electronic device 120, and the aforementioned steps in FIG. 5 are not only used for synchronizing the first electronic device 120 and the TV 110 to enter the power-on state, but also used for synchronizing the first electronic device 120 and the TV 110 to enter the power-off state.

In view of the above, a synchronization control device and a synchronization control method for use in a TV system are provided in the invention. The synchronization control device and the synchronization control method are capable of synchronizing the power states of the TV and the first electronic device (e.g. a set-top box) in the TV system. With help of the synchronization control device, the user is capable of synchronizing the power states of the first electronic device and the TV by merely using the remote control of the first electronic device to turn on or off power to the first electronic device, thereby increasing the convenience for the user and improving user experience.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronization control device for use in a TV system, wherein the TV system comprises a TV and a first electronic device, and the synchronization control device comprises:
a microcontroller;
a first detection apparatus, comprising:
a first color image sensor, for detecting a first status of a first power indicator of the TV; and
a first infrared emitter, for emitting a first infrared control signal to the TV to switch a first power state of the TV; and
a second detection apparatus, comprising a second color image sensor to detect a second status of a second power indicator of the first electronic device,
wherein the microcontroller determines a second power state of the first electronic device according to the second status of the second power indicator of the first electronic device, and determines the first power state of the TV according to the first status of the first power indicator of the TV,
wherein when the first power state of the TV is different from the second power state of the first electronic device, the microcontroller controls the first infrared emitter to emit the first infrared control signal to the TV to switch the first power state of the TV, so that the first power state of the TV is synchronized to the second power state of the first electronic device.

2. The synchronization control device as claimed in claim 1, wherein the first detection apparatus further comprises a first light insulation component for fully covering the first color image sensor to be insulated from ambient light, so that the first color image sensor detects the first status of the first power indicator of the TV.

3. The synchronization control device as claimed in claim 1, wherein the second detection apparatus further comprises a second light insulation component for fully covering the second color image sensor to be insulated from ambient light, so that the second color image sensor detects the second status of the second power indicator of the first electronic device.

4. The synchronization control device as claimed in claim 1, wherein the TV and the synchronization control device are connected to a power control apparatus that is configured to provide power, and when the first power state of the TV is different from the second power state of the first electronic device, the microcontroller controls the power control apparatus to provide or cut off power to the TV to switch the first power state of the TV, so that the first power state of the TV is synchronized to the second power state of the first electronic device.

5. The synchronization control device as claimed in claim 1, wherein the second detection apparatus further comprises a second infrared emitter, and the microcontroller receives a power activation signal from a remote control to control the second infrared emitter to emit a second infrared control signal to the first electronic device to switch the second power state of the first electronic device.

6. A synchronization control method for use in a TV system, wherein the TV system comprises a TV, a first electronic device, and a synchronization control device, the method comprising:
utilizing a first color image sensor of the synchronization control device to detect a first status of a first power indicator of the TV;
utilizing a first infrared emitter of the synchronization control device to emit a first infrared control signal to the TV to switch a first power state of the TV;
utilizing a second color image sensor of the synchronization control device to detect a second status of a second power indicator of the first electronic device;
determining a second power state of the first electronic device according to the second status of the second power indicator of the first electronic device, and determining the first power state of the TV according to the first status of the first power indicator of the TV; and
controlling the first infrared emitter to emit the first infrared control signal to the TV to switch the first power state of the TV when the first power state of the TV is different from the second power state of the first electronic device, so that the first power state of the TV is synchronized to the second power state of the first electronic device.

7. The method as claimed in claim 6, wherein the first detection apparatus further comprises a first light insulation component for fully covering the first color image sensor to be insulated from ambient light, so that the first color image sensor detects the first status of the first power indicator of the TV.

8. The method as claimed in claim 6, wherein the second detection apparatus further comprises a second light insulation component for fully covering the second color image sensor to be insulated from ambient light, so that the second color image sensor detects the second status of the second power indicator of the first electronic device.

9. The method as claimed in claim 6, further comprising:
   connecting the TV and the synchronization control device to a power control apparatus that is configured to provide power; and
   when the first power state of the TV is different from the second power state of the first electronic device, controlling the power control apparatus to provide or cut off power to the TV to switch the first power state of the TV, so that the first power state of the TV is synchronized to the second power state of the first electronic device.

10. The method as claimed in claim 6, wherein the second detection apparatus further comprises a second infrared emitter, and the method further comprises:
   receiving a power activation signal from a remote control to control the second infrared emitter to emit a second infrared control signal to the first electronic device to switch the second power state of the first electronic device.

* * * * *